United States Patent [19]

Davriu et al.

[11] Patent Number: 5,127,456
[45] Date of Patent: Jul. 7, 1992

[54] SHEATHED BEAD RING TO PNEUMATIC TIRES; METHOD OF PRODUCING SUCH A BEAD RING; PNEUMATIC TIRES HAVING SUCH A BEAD RING

[75] Inventors: Georges Davriu, Mozac; Maurice Rey, Clermont-Ferrand, both of France

[73] Assignee: Compagnie Generale des Etablissements Michelin, Clermont-Ferrand, France

[21] Appl. No.: 602,055

[22] Filed: Oct. 24, 1990

Related U.S. Application Data

[63] Continuation of Ser. No. 281,923, Dec. 5, 1988, abandoned, which is a continuation of Ser. No. 71,482, Jul. 9, 1987, abandoned, which is a continuation-in-part of Ser. No. 817,908, Jan. 10, 1986, Pat. No. 4,754,794.

[30] Foreign Application Priority Data

Jul. 9, 1986 [FR] France .................. 86 10372

[51] Int. Cl.⁵ .............................. B29D 30/48
[52] U.S. Cl. .................. 152/540; 152/547; 156/136; 245/1.5
[58] Field of Search ............ 152/539, 544, 547, 540; 156/136, 422, 460; 245/1.5; 57/210, 232, 234, 250, 251, 258, 902; 264/331.19, 328.1

[56] References Cited

U.S. PATENT DOCUMENTS

| | | | |
|---|---|---|---|
| 1,503,883 | 8/1924 | Cobb | 152/540 X |
| 3,064,414 | 11/1962 | Ando | 152/539 X |
| 3,237,674 | 3/1966 | Budd et al. | |
| 3,612,139 | 10/1971 | Marzocchi et al. | |
| 4,168,193 | 9/1979 | Brunet et al. | 152/540 X |
| 4,202,164 | 5/1980 | Simpson et al. | 57/232 |
| 4,320,791 | 3/1982 | Katsuhiko et al. | |
| 4,640,179 | 2/1987 | Cameron | 57/232 X |
| 4,754,794 | 7/1988 | Bocquet et al. | 152/540 X |

FOREIGN PATENT DOCUMENTS

| | | | |
|---|---|---|---|
| 0154597 | 9/1985 | European Pat. Off. | |
| 1918224 | 7/1970 | Fed. Rep. of Germany | |
| 1380138 | 10/1964 | France | |
| 1448380 | 6/1966 | France | |
| 2103110 | 4/1972 | France | |
| 2234126 | 1/1975 | France | |
| 1059821 | 2/1967 | United Kingdom | |
| 1163108 | 9/1969 | United Kingdom | 152/540 |
| 1346997 | 2/1974 | United Kingdom | |

*Primary Examiner*—Geoffrey L. Knable
*Attorney, Agent, or Firm*—Brumbaugh, Graves, Donohue & Raymond

[57] ABSTRACT

A bead ring for pneumatic tires comprises an assembly of wires which is covered by a sheath made of a material whose secant modulus in extension, measured at 10% elongation and at room temperature, is equal to at least 70 MPa.

10 Claims, 2 Drawing Sheets

SHEATHED BEAD RING TO PNEUMATIC TIRES; METHOD OF PRODUCING SUCH A BEAD RING; PNEUMATIC TIRES HAVING SUCH A BEAD RING

This application is a continuation of U.S. application Ser. No. 281923, filed Dec. 5, 1988, now abandoned, which is a continuation of U.S. application Ser. No. 071482, filed Jul. 9, 1987, now abandoned, which is a continuation-in-part of an U.S. application, Ser. No. 817908, filed Jan. 10, 1986, now U.S. Pat. No. 4,754,794 issued Jul. 5, 1988.

BACKGROUND OF THE INVENTION

The present invention relates to pneumatic tires and more particularly the bead rings for reinforcing the beads of such tires.

It is known to cover bead rings with a sheath made of rubber which is vulcanized, for instance, in the mold at the same time as the rest of the tire. Bead rings having such a sheath have the following drawbacks.

When the bead rings are formed of wires arranged side by side without being attached to each other, the poor mechanical resistance of the rubber sheaths does not permit sufficient cohesion of the bead rings, so that the transportation of them is difficult, since there is the danger of causing the deformation of the bead rings. Furthermore, the deformation of the rubber sheaths within the tires causes a deformation of the bead rings, with relative displacement of the wires of the bead rings, even if the bead rings were of a uniform geometrical shape at the time of the production of the tires. This geometrical instability leads to a heterogenous working of the wires, which causes damage to the beads which they reinforce. It has been attempted to avoid these drawbacks by assembling the wires together from place to place by means of collars, for instance metal collars, but such assembling is difficult and expensive to effect and it does not make it possible to avoid deformation of the bead rings in all cases.

When the bead rings are formed of wires which are held firmly together so as to form an assembly of a stable geometrical shape, this shape is frequently not adapted to the structure of the beads or to the stresses existing in the beads, and the rubber sheaths do not permit such an adaptation in shape as a result of the deformation of these sheaths.

SUMMARY OF THE INVENTION

The object of the invention is to overcome these drawbacks.

Accordingly, the bead ring for a pneumatic tire of the invention comprises an assembly of wires covered by a sheath made of a material whose secant modulus in extension, measured at 10% elongation and at room temperature, is equal to at least 70 MPa.

The invention also relates to a method of producing a bead ring for a pneumatic tire which comprises molding around an assembly of wires a material whose secant modulus in extension, measured at 10% elongation and at room temperature, is equal at least to 70 MPa.

The invention also relates to a bead ring for a pneumatic tire produced by this method. The invention also relates to a pneumatic tire having beads, each of which is reinforced by at least one bead ring according to the invention.

The invention will be easily understood from the nonlimitative examples which follow and the entirely schematic figures illustrating these examples.

Figure 3:
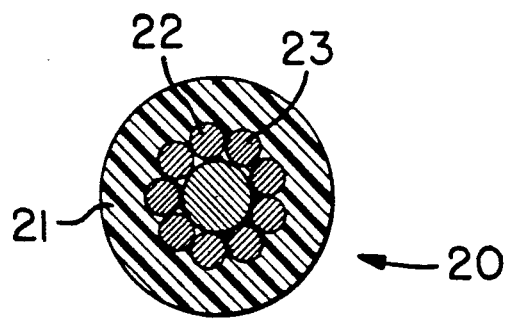
Figure 4:
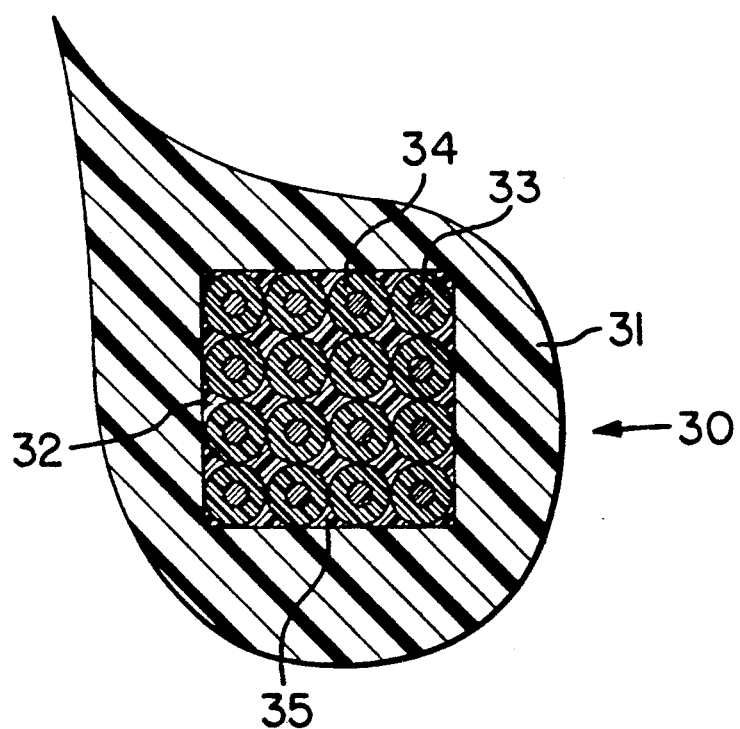

Each of FIGS. 3 and 4 shows in cross section another bead ring according to the invention.

DETAILED DESCRIPTION OF THE INVENTION

Figure 1:
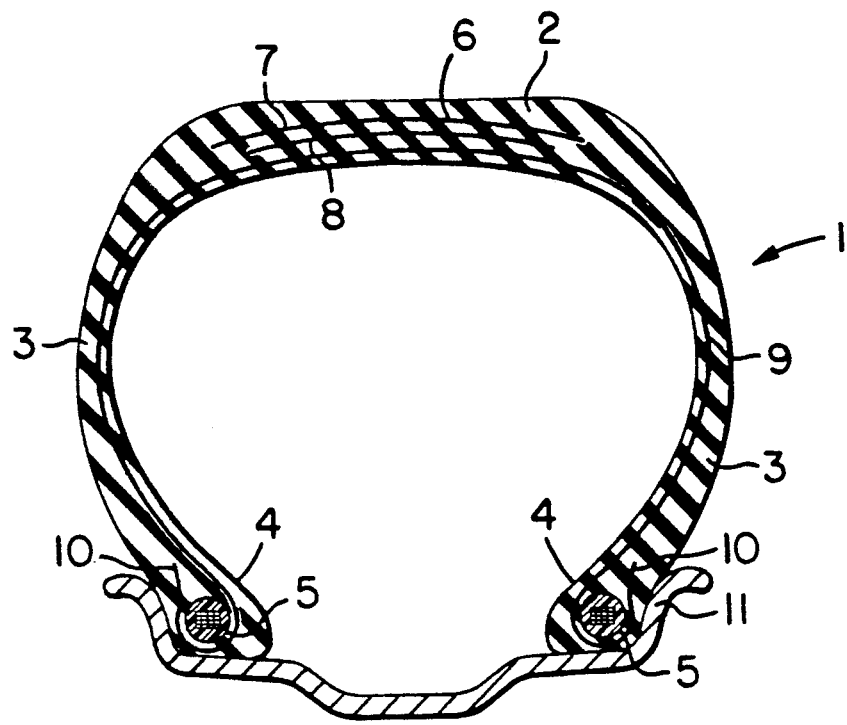
FIG. 1 shows in radial section a pneumatic tire each of the beads of which is reinforced by a bead ring according to the invention.
Figure 2:
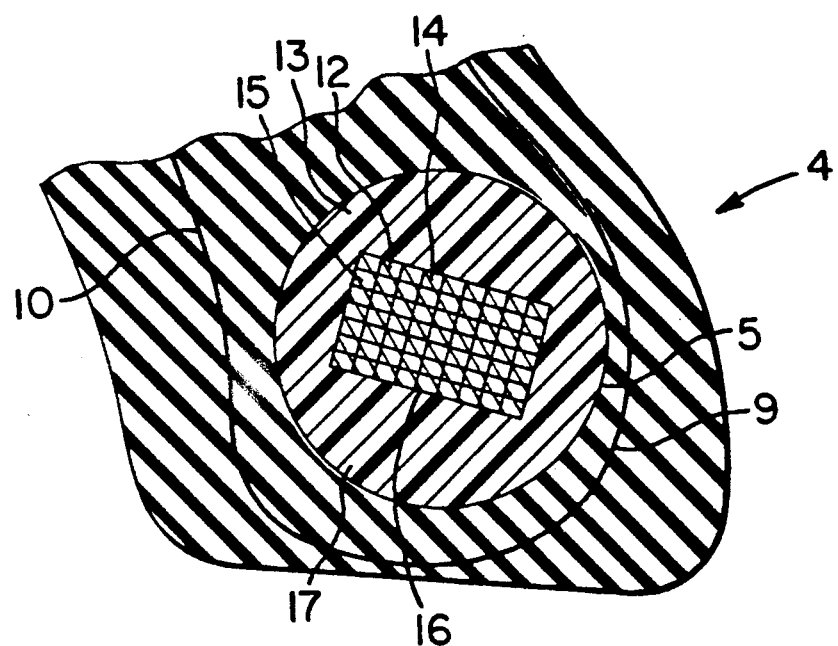
FIG. 2 shows in greater detail, in radial section, one of the beads of the tire shown in FIG. 1, with the bead ring of the invention corresponding to this bead.

FIG. 1 shows a pneumatic tire 1. This tire 1 has a crown 2, two sidewalls 3 and two beads 4, each of these beads 4 being reinforced by a bead ring 5 according to the invention. The crown 2 is reinforced, in known manner, by a crown reinforcement 6, formed, for instance, of two crossed plies 7, 8, and a radial carcass ply 9 which extends from one bead 4 to the other, it being wrapped in known manner around each of the bead rings 5, the upturned portion 10 of the carcass ply 9 being, for instance, arranged towards the outside of the tire 1, which is shown mounted on its rim 11. A portion of a bead 4 is shown in greater detail in FIG. 2. From this FIG. 2 it can be seen that the bead ring 5 according to the invention is formed of two parts, namely:

an assembly 12 of wires;

a sheath 13 surrounding the assembly 12.

The assembly 12 is of the so-called "package" type, similar to the one described, for instance, in French Patent Application No. 82/08751 published under No. 2,526,708 (which corresponds to U.S. Pat. No. 4,477,301). This assembly 12 is formed of a wire 14 wound in turns 15. The section of this wire 14 in a radial plane, that is to say a plane passing through the axis of the bead ring 5, which is the axis of revolution of the tire 1, is a rectangular section. The turns 15 are applied one against the other by simple contact, that is to say without bonding on the whole of zones of contact between them, and the assembly 12 is of a generally rectangular cross section in the radial plane described above. The radially inner face 16 of the assembly 12 is frustoconical and smooth, and this assembly 12 is, for instance, manufactured by the method described in French Patent No. 2,456,610. This method consists essentially of imparting to the steel wire 14 a permanent deformation by means of a suitable deviated flexing prior to its winding on the manufacturing form. Thus in the same layer and from one layer to the next the juxtaposed and superimposed turns 15 are well aligned with each other. It also results from this that the wire 14 which has been treated in this manner is without any residual elastic stresses and the turns 15 no longer have a tendency to unwind by themselves.

In accordance with the invention, the sheath 13 is made of a material 17 whose secant modulus in extension, measured at 10% elongation and at room temperature (about 20° C.), is equal to at least 70 MPa. This secant modulus is preferably equal to at least 400 MPa. This sheath 13 is preferably made of a thermoplastic material 17 by the injection molding of this material 17 around the assembly 12, which has been previously arranged in the injection mold.

By way of example, the bead ring 5 has the following characteristics:

- wire 14: steel wire, the rectangular cross section of this wire having a size of 2×1.3 mm;
- assembly 12: This is formed by seven layers of nine wires each and therefore has sixty-three turns, the stacking of the layers taking place in the direction of the smallest dimension of the rectangular cross section of the wire 14; this assembly 12 therefore has, seen in a radial plane, a rectangular shape of a size of about 18 mm×9.1 mm;
- the sheath 13 is made of nylon 6 by injection molding, as previously described; this nylon 6 has an elongation upon rupture, measured at room temperature (about 20° C.), of about 40% and a secant modulus in extension of about 500 MPa, this secant modulus being measured at 10% elongation and at room temperature; this sheath 13 has a substantially circular radial cross section of a radius of 12 mm.
- the bead ring 5 has an inside diameter of 565 mm and the pneumatic tire 1 having the two bead rings 5 is a pneumatic tire for a heavy vehicle of size 12×22.5; the rim 11 on which the tire 1 is mounted is a rim with conical seat.

The advantages of the bead ring 5 are as follows:

The sheath 13 makes it possible to hold the turns 15 of the wire 14 together; these turns 15 therefore cannot separate from each other upon the handling of the bead ring 5, for instance when it is transported or placed on a drum during the making of the tire 1;

the sheath 13 makes it possible for the bead ring 5 to retain a constant geometrical shape upon the rolling of the tire 1, without detachment of the turns 15; the working of the turns 15 is therefore uniform during the entire life of the tire 1;

The cohesion of the bead ring 5 is obtained in simple fashion by molding the sheath 13 around the assembly 12, which has been placed in a mold. In order to obtain a minimal cohesion of the assembly 12 upon the production of the sheath 13, when this assembly 12 is placed in the mold, it is sufficient, for instance, to arrange a limited number of clips around this assembly 12 or to interpose at regular or irregular intervals pieces of adhesive tape between the layers of turns, in accordance with the aforementioned French Patent Application No. 82/08751.

The invention is not limited to the assemblies of the package type which have been described above and it can be applied to other types of assemblies of reinforcement wires, as shown in FIGS. 3 and 4.

The bead ring 20 of the invention, which is shown in FIG. 3, has a sheath 21 arranged around an assembly 22 of braided wires 23.

The bead ring 30 of the invention, which is shown in FIG. 4, has a sheath 31 arranged around an assembly 32 in accordance with French Patent Application No. 85/00875 (which corresponds to U.S. application Ser. No. 817,906, filed Jan. 10, 1986, now U.S. Pat. No. 4,754,794). This assembly 32 has a plurality of wires 33, each surrounded individually by a sheath 34 and a matrix 35 in which the wires 33 together with their sheaths 34 are arranged. The sheaths 34 of two adjacent wires 33 are in contact with each other, that is to say the distance between two adjacent wires 33 is constant and equal to twice the thickness of the sheath 34, which guarantees a given geometrical shape and avoids direct contact between the wires 33. One thus obtains uniform performance for the assembly 32, avoiding the risk of wear of the wires 33 on each other. The assembly 32 is produced by double sheathing, as described in the aforementioned French Patent Application No. 85/00875, the sheaths 34 consisting, for instance, of nylon 66 and the matrix 35 being made, for instance, of nylon 6, the sheath 31 consisting, for instance, also of nylon 6, which is molded around the assembly 32 after the production of the latter.

By way of example, the bead ring 30 has the following characteristics:

- wires 33: steel wires; diameter of each wire; 1 mm; number of wires (that is to say of turns) in the bead ring 30: sixteen, the bead ring 30 having a square cross section with four layers of four turns each, the sides of this square cross section being tangent to the sheaths 34 of the wires 33 located in the vicinity of these sides;
- sheaths 34: thickness equal to 0.5 mm; material of these sheaths 34: nylon 66; melting point: 255° C.; secant modulus in extension measured at 10% elongation: about 550 MPa; the wires 33 are preheated before the production of the sheaths 34 in known manner in order to cause good adherence between the wires 33 and the material of the sheaths 34;
- matrix 35: material of this matrix 35: nylon 6; melting point of this matrix 35: 220° C.; secant modulus in extension, measured at 10% elongation: about 500 MPa; before the production of the assembly 32, the material of the matrix 35 is in the form of an outer solid sheath of a thickness of 0.13 mm, arranged around the sheath 34, these two sheaths individually surrounding each wire 33, in accordance with the aforementioned French Patent Application No. 85/00875; the melting of this outer sheath is brought about without melting the sheath 34; the sixteen turns of wires 33 are then wound in the gorge of a drum in order to cause the formation of the matrix 35 by migration of the material of the matrix 35 between the solid sheaths 34, and this matrix 35 is solidified, the gorge of the drum serving as a mold for the assembly 32 thus obtained;
- sheath 31: this sheath 31 is obtained by molding nylon 6 around the assembly 32 after the latter has been produced, that is to say the same material is used, for example, for the sheath 31 and the matrix 35;
- the bead ring 30 thus obtained has an inside diameter of 355 mm and it is used in a pneumatic tire of size 175×14, used for passenger cars.

The geometrical values and the secant moduli indicated previously for the bead ring 30 are determined at room temperature, i.e., about 20° C.

The assembly 32 is obtained with a square cross section and the invention makes it possible to surround the assembly 32 with a sheath 31 the shape of which is other than square so as to adapt the shape to the structure and the operating conditions of the bead of the tire in which it is arranged.

The shape of the sheath of the bead rings according to the invention is not necessarily circular; thus the sheath 31 of the bead ring 30 shown in FIG. 4 has a so-called "teardrop shape", which may have the advantage of permitting a better anchoring of this bead ring 30 in the bead which it reinforces.

In all the examples of bead rings described above, the sheath is arranged on the outside of the assembly of wires and therefore does not play the role of a matrix between the wires of this assembly. The effect of the sheath on the assembly is therefore only external, the sheath making it possible, in particular, to transfer the stresses uniformly from the carcass to the reinforcement wires of the assembly, within the bead ring. The extensibility of the sheath facilitates this transmission of stresses, the material of the sheath having preferably for this purpose an elongation upon rupture equal to at least 15% and at most to 200%, this elongation upon rupture being measured at room temperature (about 20° C.). The material of the sheath is preferably a thermoplastic material the melting point of which is greater than 200° C. so as to improve the resistance of the bead ring to accidental heating of the bead, due, for instance, to a jamming of the brakes.

Of course the invention is not limited to the embodiments described above.

What is claimed is:

1. A bead ring of stable cross-sectional geometric shape for a pneumatic tire which comprises an assembly of wires and an outer stress transmitting sheath molded around the outside of said assembly to encase entirely the assembly of wires and define the exterior surface of stable cross-sectional geometric shape of the bead ring, said sheath being made of a single thermoplastic material having a melting point greater than 200° C. and whose secant modulus in extension, measured at 10% elongation and at room temperature, is equal to at least 70 MPa and having an elongation upon rupture equal to at least 15% and at most 200% measured at room temperature, the cross-section of the stable geometric shape of the sheath differing substantially from the cross-sectional shape of the assembly of wires so that the radial thickness of the sheath between the outer periphery of the assembly of wires and the outer periphery of the sheath varies around the assembly of wires.

2. A bead ring according to claim 1, wherein the secant modulus is equal to at least 400 MPa.

3. A bead ring according to claim 1, wherein the material is a nylon.

4. A bead ring according to claim 1, wherein the wires of the assembly are applied one against the other by simple contact.

5. A bead ring as set forth in claim 1 in which the assembly of wires is encased in thermoplastic material, the sheath surrounding the encased assembly of wires.

6. A pneumatic tire having beads each of which is reinforced by at least one bead ring according to claim 1.

7. A method of producing a bead ring of stable cross-sectional geometric shape for a pneumatic tire, which comprises molding a stress transmitting sheath around the outside of an assembly of wires to encase entirely the assembly of wires and define the exterior surface of stable cross-sectional geometric shape of the bead ring, said sheath being a single thermoplastic material having a melting point greater than 200° C. and whose secant modulus in extension, measured at 10% elongation and at room temperature, is equal to at least 70 MPa, said single thermoplastic material having an elongation upon rupture equal to at least 15% and at most 200% measured at room temperature, the cross-section of the stable geometric shape of ht sheath differing substantially from the cross-sectional shape of the assembly of wires so that the radial thickness of the sheath between the outer periphery of the assembly of wires and the outer periphery of the sheath varies around the assembly of wires.

8. A method according to claim 7, wherein the secant modulus is equal to at least 400 MPa.

9. A method according to claim 7, wherein the material is a nylon.

10. A method as set forth in claim 9 including pre-molding the assembly of wires in a matrix before molding the sheath on the assembly of wires.

* * * * *

UNITED STATES PATENT AND TRADEMARK OFFICE
CERTIFICATE OF CORRECTION

PATENT NO. : 5,127,456

DATED : July 7, 1992

INVENTOR(S) : Davriu et al.

It is certified that error appears in the above-identified patent and that said Letters Patent is hereby corrected as shown below:

Title page, item [54], line 1, "TO" should read --FOR--.

Col. 1, line 1, "TO" should read --FOR--.

Col. 6, line 25, "ht" should read --the--.

Signed and Sealed this

Fourteenth Day of September, 1993

Attest:

BRUCE LEHMAN

Attesting Officer     Commissioner of Patents and Trademarks